United States Patent
Sweetland (10) Patent No.: US 10,424,800 B2
(45) Date of Patent: Sep. 24, 2019

(54) PROCESS FOR MAKING A REINFORCED MEMBRANE-SEAL ASSEMBLY AND MEMBRANE-SEAL ASSEMBLY FOR FUEL CELL

(71) Applicant: JOHNSON MATTHEY FUEL CELLS LIMITED, London (GB)

(72) Inventor: Lee Alan Sweetland, Wiltshire (GB)

(73) Assignee: Johnson Matthey Fuel Cells Limited, London (GB)

( * ) Notice: Subject to any disclaimer, the term of this patent is extended or adjusted under 35 U.S.C. 154(b) by 34 days.

(21) Appl. No.: 15/757,188

(22) PCT Filed: Sep. 8, 2016

(86) PCT No.: PCT/GB2016/052773
§ 371 (c)(1),
(2) Date: Mar. 2, 2018

(87) PCT Pub. No.: WO2017/042563
PCT Pub. Date: Mar. 16, 2017

(65) Prior Publication Data
US 2018/0287177 A1    Oct. 4, 2018

(30) Foreign Application Priority Data
Sep. 8, 2015    (GB) .................................. 1515870.2

(51) Int. Cl.
*H01M 8/10*     (2016.01)
*H01M 8/1058*   (2016.01)
(Continued)

(52) U.S. Cl.
CPC ....... *H01M 8/1058* (2013.01); *H01M 8/0271* (2013.01); *H01M 8/0276* (2013.01);
(Continued)

(58) Field of Classification Search
CPC ............. H01M 8/1058; H01M 8/0271; H01M 8/0276; H01M 8/0285; H01M 8/1069; H01M 8/1004; H01M 8/1018
See application file for complete search history.

(56) References Cited

U.S. PATENT DOCUMENTS

2009/0165933 A1    7/2009 Losch et al.

FOREIGN PATENT DOCUMENTS

| DE | 102010025814 A1 | 5/2011 |
| EP | 0731520 A1 | 9/1996 |

(Continued)

OTHER PUBLICATIONS

GB1515870.2 Search Report Under Section 17(5) dated May 17, 2016.

(Continued)

*Primary Examiner* — Jane J Rhee
(74) *Attorney, Agent, or Firm* — BakerHostetler (57) ABSTRACT

The present invention provides a process for the manufacture of a reinforced membrane-seal assembly, the process comprising, forming one or more strips of an ion-conducting component in a plane on a temporary carrier component, forming a plurality of strips of seal component in the same plane on the temporary carrier component, such that the one or more strips of an ion-conducting component lie between two of said strips of seal component, wherein a planar reinforcing component comprising a plurality of pores is provided in the plane, such that the ion-conducting component and the seal component fill the plurality of pores, the one or more strips of an ion-conducting component, the plurality of strips of seal component and the planar reinforcing component thereby together form a reinforced membrane-seal assembly, and wherein each strip of ion-conducting component extends from a first end of said assembly to a second opposite end.

15 Claims, 3 Drawing Sheets

(51) Int. Cl.
  *H01M 8/1069* (2016.01)
  *H01M 8/0271* (2016.01)
  *H01M 8/0286* (2016.01)
  *H01M 8/0276* (2016.01)
  *H01M 8/1004* (2016.01)
  *H01M 8/1018* (2016.01)

(52) U.S. Cl.
  CPC ....... *H01M 8/0286* (2013.01); *H01M 8/1069* (2013.01); *H01M 8/1004* (2013.01); *H01M 8/1018* (2013.01); *Y02P 70/56* (2015.11)

(56) References Cited

FOREIGN PATENT DOCUMENTS

| | | |
|---|---|---|
| EP | 2260528 | 9/2009 |
| WO | WO2009/040571 A1 | 4/2009 |
| WO | WO2009/105896 A1 | 9/2009 |
| WO | WO2009/109780 A1 | 9/2009 |
| WO | WO2012017225 A1 | 2/2012 |
| WO | 2015145129 A1 | 10/2015 |
| WO | WO2015/145128 A1 | 10/2015 |
| WO | WO2015145127 A1 | 10/2015 |

OTHER PUBLICATIONS

PCT/GB2016/052773 Search Report dated Dec. 2, 2016.
PCT/GB2016/052773 Written Opinion dated Dec. 2, 2016.

PROCESS FOR MAKING A REINFORCED MEMBRANE-SEAL ASSEMBLY AND MEMBRANE-SEAL ASSEMBLY FOR FUEL CELL

CROSS-REFERENCE TO RELATED APPLICATIONS

This application is the National Stage of International Patent Application No. PCT/GB2016/052773, filed Sep. 8, 2016, which claims priority from Great Britain Patent Application No. 1515870.2, filed Sep. 8, 2015, the disclosures of each of which are incorporated herein by reference in their entirety.

FIELD OF THE INVENTION

The present invention relates to a process for making a reinforced membrane-seal assembly and in particular to a reinforced membrane-seal assembly suitable for use in a fuel cell or an electrolyser.

BACKGROUND OF THE INVENTION

A fuel cell is an electrochemical cell comprising two electrodes separated by an electrolyte. A fuel, such as hydrogen or an alcohol, such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In a hydrogen-fuelled or alcohol-fuelled proton exchange membrane fuel cell (PEMFC), the electrolyte is a solid polymeric membrane, which is electronically insulating and proton conducting. Protons, produced at the anode, are transported across the membrane to the cathode, where they combine with oxygen to form water. The most widely used alcohol fuel is methanol, and this variant of the PEMFC is often referred to as a direct methanol fuel cell (DMFC).

The principal component of the PEMFC is known as a membrane electrode assembly (MEA) and is essentially composed of five layers. The central layer is the polymeric ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Conventionally, the MEA can be constructed by a number of methods outlined hereinafter:
(i) The electrocatalyst layer may be applied to the gas diffusion layer to form a gas diffusion electrode. Two gas diffusion electrodes can be placed either side of an ion-conducting membrane and laminated together to form the five-layer MEA;
(ii) The electrocatalyst layer may be applied to both faces of the ion-conducting membrane to form a catalyst-coated ion-conducting membrane. Subsequently, gas diffusion layers are applied to both faces of the catalyst-coated ion-conducting membrane.
(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Conventionally, the MEA is constructed so that the central polymeric ion-conducting membrane extends to the edge of the MEA, with the gas diffusion layers and electrocatalyst layers being smaller in area than the membrane such that there is an area around the periphery of the MEA which comprises ion-conducting membrane only. The area where no electrocatalyst is present is a non-electrochemically active region. Film layers, typically formed from non-ion conducting polymers, are generally positioned around the edge region of the MEA on the exposed surfaces of the ion-conducting membrane where no electrocatalyst is present to seal and/or reinforce the edge of the MEA. An adhesive layer may be present on one or both surfaces of the seal film layer. The seal film layers are conventionally produced by cutting openings in a complete film to form a so-called seal "window frame" that is then positioned around the edge of the MEA on the exposed ion-conducting membrane surfaces.

The layers in the MEA are typically bonded by a lamination process. It is common practice that the polymeric ion-conducting membrane also comprises a reinforcement material, such as a planar porous material, embedded within the thickness of the membrane, to provide for improved mechanical strength of the membrane and thus increased durability of the MEA and lifetime of the fuel cell.

To enable a faster rate of commercialisation of fuel cells and a greater market penetration it is necessary to make further improvements to the MEA design and manufacturing processes to significantly reduce manufacturing costs and increase the manufacturing output rate for the MEA. As such continuous high volume manufacturing processes, wherein a continuous roll of precursor MEA is produced at high speed, are being introduced as alternatives to manufacturing processes where individual MEAs are assembled from the separate singular MEA components.

Typically, much of the polymeric ion-conducting material used in the membrane extends beyond the electrochemically active region into a non-electrochemically active region, often by up to several centimeters. In low geometric area MEAs this non-electrochemically active region can contribute to as much as 50% of the entire MEA geometric area. The membrane which extends beyond the electrochemically active area does not contribute to the activity and performance. The polymeric ion-conducting membrane is one of the most costly components in the fuel cell, and it is thus desirable to minimise its usage. This design approach is commonly practiced for both discrete singular MEA assembly processes as well as for continuous higher speed assembly processes. In the latter case the seal window frame film is provided in a continuous fashion as a so-called seal "ladder" film. The seal film material can also be of high cost, and thus there is a need also to minimise the usage of the seal material in the development of improved MEA manufacturing processes.

WO2015/145127 discloses an approach to the formation of a membrane-seal assembly (MSA) within the MEA which seeks to reduce production costs. An MSA can be considered as a core building block for the manufacture of an MEA, in that it involves the early formation of the membrane component combined with the edge seal films layers. The method involves the formation of the MSA by deposition of an ion-conducting component and a seal component together with a planar reinforcing material and provides a process for these components to be deposited directly only in the regions in which they are required for functionality in the fuel cell. The method ensures that both the components fill the pores in the planar reinforcing material and that there are regions of ion-conducting component completely bounded by seal component across the plane of the MSA produced. As a result, the preferred MSA produced according to WO2015/145127 has central portions of ion-conducting material surrounded with window frames of seal material. Advantageously, this reduces the amount of costly ion-conducting material required. Advantageously, the deposition technique also avoids wastage of the seal material associated with conventional MEA designs. The method described is particularly applicable to a continuous high speed manufacturing process.

Therefore, one aim is to provide an improved process that tackles the drawbacks associated with the conventional prior art and which also provides for a further improved process over that described in WO2015/145127, or at least provides a commercial alternative thereto.

The present invention therefore seeks to provide an improved process for manufacturing a reinforced membrane-seal assembly, which provides for a high utilisation of the membrane material and the seal film material in the reinforced membrane-seal assembly.

SUMMARY OF THE INVENTION

According to a first aspect, the invention provides a process for the manufacture of a reinforced membrane-seal assembly, the process comprising, forming one or more strips of an ion-conducting component in a plane on a temporary carrier component, forming a plurality of strips of a seal component in the same plane on the temporary carrier component, such that the one or more strips of an ion-conducting component lie between two of said strips of seal component, wherein a planar reinforcing component comprising a plurality of pores is provided in the plane, such that the ion-conducting component and the seal component fill the plurality of pores, the one or more strips of an ion-conducting component, the plurality of strips of seal component and the planar reinforcing component thereby together form a reinforced membrane-seal assembly, and wherein each strip of ion-conducting component extends from a first end of said reinforced membrane-seal assembly to a second opposite end.

Since the ion-conducting component which forms part of the reinforced MSA is formed as continuous strips in the present invention, this leads to significant savings on materials compared to the provision of a complete layer of ion-conducting component within an MEA.

In addition, since the ion-conducting component which forms part of the reinforced MSA is formed as continuous strips in the present invention, rather than as discrete regions as disclosed in WO2015/145127, this has the advantage of simplifying the manufacturing process. That is, the provision of a plurality of aligned strips allows for a faster deposition process employing simpler equipment. That is, the components only need to be deposited in strips along the machine direction; the seal component does not need to be deposited across the entire transverse (cross-web) direction.

Indeed, this new design leads to an easier implementation for high volume manufacture than other methods since there are substantially more available techniques and equipment that can be used to deposit the strips of material compared to depositing complete window frames that fully bound a region of ion-conducting component on all sides. This would allow MEAs produced from this design and process to be introduced commercially much earlier than the fully-bounded design, while still giving a substantial saving in ion-conducting component over MEAs produced to conventional designs and by conventional processes.

A further technical benefit is that with the correct orientation the new design will allow the reactant porting regions of the MEA design (porting holes cut into the edges of the MEA to enable the reactant flow into and out of the MEA) to be formed in only the edges of the resulting MEA that comprises seal component. This will help prevent cross contamination during operation. That is, if the process described herein is implemented so that only the deposited seal region is in the porting area of the final MEA it removes potential contamination issues for the fuel cell stack, as it prevents a cut membrane edge that might otherwise be in the porting region from coming into contact with the reactants flowing through the ports.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

DETAILED DESCRIPTION OF THE INVENTION

The invention provides a process for the manufacture of a reinforced membrane-seal assembly. A membrane-seal assembly is the core of an MEA as discussed above. It requires the provision of at least an ion-conducting component. As described herein, the MSA comprises the ion-conducting component, the seal component and the planar reinforcing component, wherein the pores of the planar reinforcing component are filled with the ion-conducting component or the seal component. For the avoidance of doubt, if the planar reinforcing component extends beyond an edge or end of the strips discussed herein, then it is not considered part of the MSA.

The process comprises a number of steps. The first steps involve the formation of strips within a plane. The plane may be considered to extend in x and y-axis directions, such that the z-axis provides the thickness of the strips applied in the plane. Typically, the MSA may be formed as a roll and preferably the strips discussed herein will extend along the longest (rolled) length of the roll. That is, the strips will lie parallel to each other around the roll when it is stored. This longest direction may be called the machine direction, with the perpendicular direction across the strips being the transverse direction.

The present invention preferably provides a continuous roll of MSA having continuous strips of parallel, alternating, ion-conducting component and seal component. This acts as the primary building block for forming subsequent products such as a catalyst-coated ion-conducting membrane (CCM) or a fully integrated MEA, and can be produced in large volumes at high speeds using the method described herein, and stored on a temporary carrier component until it is required for further processing into CCM or MEA products.

The method comprises the formation of one or more strips of an ion-conducting component in the plane. The ion-conducting component is selected from the group of proton-conducting polymers or is selected from the group of anion-conducting polymers, such as a hydroxyl anion-conducting polymer. Examples of suitable proton-conducting polymers include perfluorosulphonic acid ionomers (e.g. Nafion™ (Chemours Company), Aquivion® (Solvay Specialty Polymers), Flemion™ (Asahi Glass Group) and AciplexT™ (Asahi Kasei Chemicals Corp)), or ionomers based on a sulphonated hydrocarbon such as those available from FuMA-Tech GmbH as the Fumapem® P, E or K series of products, JSR Corporation, Toyobo Corporation, and others. Examples of suitable anion-conducting polymers include A901 made by Tokuyama Corporation and Fumasep FAA from FuMA-Tech GmbH. For example, perfluorosulphonic acid ionomers of varying equivalent weights may be used as the ion-conducting component.

The methods of forming the strips of ion-conducting component are discussed below. The one or more strips, in the form of ribbons of ion-conducting component, have a width which extends across the plane (transverse direction) and a length which extends along the plane (machine direction).

Each strip of ion-conducting component extends from a first end of said MSA to a second opposite end. That is, in contrast to WO2015/145127, in the present invention the strips do not form discrete regions bounded on all sides by seal component. Rather, the strips extend along the MSA. The first end and the second opposite end represent the start and end of the material produced in the machine direction.

The thickness of the strip of ion-conducting component in the MSA, measured in the z-axis, will depend upon its final application. In general however, the thickness will be ≤250 μm, such as ≤100 μm, such as ≤50 μm, such as ≤30 μm, for example ≤20 μm. Suitably, the thickness is ≥5 μm. In one embodiment, the final reinforced MSA has a thickness in the through-place direction (z-direction) of from 8-50 μm.

The method also comprises the formation of a plurality of strips of a seal component in the plane. The seal component is required to be compatible with the ion-conducting component and the planar reinforcing component. The seal component can be a fluid or viscous paste able to be deposited/applied onto the temporary carrier component. The seal component will be dried during processing steps and must withstand the temperatures to which it is subjected. The seal component should be non-ion conducting and within the final product must possess the necessary mechanical, thermal and chemical characteristics for operation in a fuel cell stack. The seal component must be able to withstand any deformation when the temporary carrier component is removed on completion of the processing.

The material for the seal component is selected from the group consisting of: fluorosilicones, polyurethanes, co-polyamides, epoxies and fluoroacrylates. Specific examples of suitable sealing components include: polyvinylidenefluoride (PVDF), polyetherimide (PEI), polyimide (PI), polyethersulphone (PES), fluorinated ethylene propylene (FEP), polyethylene naphthalate (PEN), ethylene tetrafluoroethylene (ETFE), Viton®, polyethylene oxide (PEO), polyphenylene ether (PPE), polyethylene terephthalate (PET), polyacrylonitrile (PAN), poly(p-phenylene sulphide) (PPS), polyolefins and silicones.

The methods of deposition to form the strips of seal component are discussed below. The strips, in the form of ribbons of seal component, have a width which extends across the plane (transverse direction) and a length which extends along the plane (machine direction). The thickness of the strips of seal component is preferably within the range discussed above for the ion-conducting component. Preferably the thickness of the ion-conducting component and the seal component are substantially uniform and preferably are substantially the same.

In one embodiment, there is one strip of ion-conducting component lying between two of said strips of seal component. That is, the produced MSA comprises a single central strip of ion-conducting component. This MSA, if prepared in a long roll, may then be further processed into CCMs and MEAs by applying other components onto the roll of MSA, or may be divided, by cutting in the transverse direction, into a plurality of discrete MSAs for further processing to form CCMs and MEAs.

In an alternative embodiment, there are a plurality of strips of ion-conducting component and the strips of ion-conducting component and seal component alternate. This permits for the formation of single strips of MSA by slitting the strips of seal component along their length (in the machine direction), to provide a single strip of MSA having a single strip of ion-conducting component between two strips of seal component. This therefore facilitates even more efficient high volume manufacture.

Preferably the strips of the ion-conducting component and the strips of seal component are simultaneously deposited to maximise speed of manufacture and achievement of even strip height.

Alternatively, the strips of the ion-conducting component and the strips of seal component are deposited sequentially.

The strips of ion-conducting component and the seal component are formed on a temporary carrier component. The temporary carrier component provides a surface on which the strips are formed, but does not form a part of a final MSA. The temporary carrier component may be retained on the MSA in a roll-good form for storage. Preferably the method further comprises a step of removing the reinforced MSA from the temporary carrier component. The temporary carrier component is not part of the final MSA, but is intended to be removed in a subsequent step; this step may be immediately after the MSA is formed or may be at some point downstream in the production process when the MSA is combined with other components to form a CCM or MEA.

The temporary carrier component provides support for the MSA during manufacture and if not immediately removed, can provide support and strength during any subsequent storage and/or transport. The material from which the temporary carrier component is made should provide the required support; should be compatible with the ion-conducting component and seal component; should be impermeable to the ion-conducting component and seal component; should be able to withstand the process conditions involved in producing the MSA; and should be able to be easily removed without damage to the MSA.

Examples of materials suitable for use include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene), polyvinylidene difluoride (PVDF); and polyolefins, such as polyethylene (PE), polypropylene (PP), biaxially oriented polypropylene (BOPP), polymethylpentene (PMP). Other examples include laminates, multi-layer extrusions and coated films/foils capable of retaining their mechanical strength/integrity at elevated temperatures, for example temperatures up to 200° C. Examples of laminates include laminates of poly(ethylene-co-tetrafluoroethylene) (ETFE) and polyethylene naphthalate (PEN); polymethylpentene (PMP) and PEN; polyperfluoroalkoxy (PFA) and polyethylene terephthalate (PET) and polyimide (PI). The laminates can have two or more layers, for example ETFE-PEN-ETFE, PMP-PEN-PMP, PFA-PET-PFA, PEN-PFA, FEP-PI-FEP, PFA-PI-PFA and PTFE-PI-PTFE. The layers may be bonded using an adhesive, such as epoxy, acrylic or polyurethane. Examples of coated films include coatings of fluoropolymers, such as PVDF, ETFE, FEP, PTFE and PFA, or coatings of polyolefins, such as PE, PP and PMP onto polymer films such as PET, heat-stabilised PET, PI, polyetherimide (PEI), polyetheretherketone (PEEK), Polyphenylene sulfide (PPS), and polyethersulphone (PES). Preferable coated films include fluoropolymer and polyolefin coated heat-stabilised PET and a double sided coating of FEP onto PI (FEP-PI-FEP). Suitably, the temporary carrier component is provided as a roll-good material.

A planar reinforcing component comprising a plurality of pores is provided in the plane, such that the ion-conducting component and the seal component fill the plurality of pores. The final structure is shown in cross-section across the transverse direction in FIG. 1, for the embodiment in which there is one strip of the ion-conducting component. By the phrase "fill the pores" is meant that at least 90% of the total pore volume in the planar reinforcing component is filled, preferably at least 95%, preferably completely filled. For the avoidance of doubt, the pores in the reinforcing component are either filled with ion-conducting component or are filled with seal component; although the pores at the boundary between a strip of ion-conducting component and a strip of seal component may be filled with both ("blended region").

The planar reinforcing component is present to provide strength and reinforcement to the MSA. The planar reinforcing component is formed from a porous material (i.e. one which has a plurality of pores). The porous material should possess at least some of the following properties: be compatible with the ion-conducting and seal components such that these components can readily impregnate into the porous material and the porous material maintains its physical integrity (i.e. retains its basic pore structure) after the impregnation; provide improved mechanical strength and dimensional stability under variable humidity of the final MEA; be non-conductive; and be chemically and thermally stable at the temperatures at which the fuel cell will be operated.

Suitable planar reinforcing components include, but are not limited to, those formed from nanofibre structures (for example formed by electrospinning or force spinning), those formed from expanded polymer networks (e.g. expanded PTFE (ePTFE)) and those formed by engineering of a planar non-porous structure. Examples of materials suitable for use in forming the planar reinforcing component are typically polymeric and include polytetrafluoroethylene (PTFE), polyvinylidene difluoride (PVDF), polyetherether ketone (PEEK), polyimide (PI), polyetherimide, polyethersulphone (PES) and polypropylene (PP).

Before use of the planar reinforcing component in the process of the invention to form the MSA, the planar reinforcing component suitably has a minimum thickness of at least 1 µm, suitably at least 5 µm and a maximum thickness of 40 µm, suitably a maximum thickness of 25 µm.

The porosity of the planar reinforcing component before use to form the MSA is suitably greater than 30%, preferably greater than 50% and most preferably greater than 70%. Suitably, the porosity is less than 95%. The porosity (n) is calculated according to the formula $n=V_v/V_t \times 100$, wherein n is the porosity, $V_v$ is the voids volume and $V_t$ is the total volume of the porous material. The porosity of the porous material can be calculated directly from measurements of the component mass and dimensions and knowledge of the true density of the reinforcing material or determined by the using methods known to those skilled in the art, such as by mercury porosimetry.

The porous material for forming the planar reinforcing component may be isotropic or anisotropic.

The planar reinforcing component can (i) extend to the edge of the MSA in the transverse direction; or (ii) not extend to the edge of the MSA in the transverse direction.

The planar reinforcing component may be provided onto wet strips of ion-conducting component and seal component so as to penetrate the strips and have the pores of the material filled with ion-conducting component or seal component. This application of the reinforcing component will typically cause the edges of the ionomer and seal component strips to move slightly and come into contact with each other, even if the strips were formed as discrete non-touching strips. This ensures that there are no unfilled void regions between the ion-conducting component and the seal component in the MSA.

Alternatively, the ion-conducting component and the seal component may be deposited directly onto the planar reinforcing component on the temporary carrier component.

Alternatively, the planar reinforcing component can be sourced with a backing layer already applied to one side of the planar reinforcing component. In this instance, the backing layer may become the temporary carrier component if it has the required properties as hereinbefore described. The ion-conducting component and the seal component may be deposited directly onto the planar reinforcing component, which is on its backing layer. Since the ion-conducting component and the seal component are formed as strips and impregnate the planar reinforcing component; they form first and second regions respectively within the planar reinforcing component. The first regions correspond to the areas of the planar reinforcing component impregnated with the ion-conducting component, while the second regions correspond to the areas of the planar reinforcing component impregnated with the seal component.

It should be appreciated that the ion-conducting component may extend into the pores of the second regions and/or the seal component may extend into the pores of the first region(s), such that there may be a blended region(s) at the interface of the first and second regions which comprises ion-conducting component and seal component. Any such blended region may be up to 5 mm wide in the transverse direction at the interface of the first region(s) and second regions.

The pores in the blended region may comprise both ion-conducting component and seal component, which may occur if, for example, the seal component and ion-conducting component are miscible.

Alternatively, if the seal component and ion-conducting component are not miscible, in the blended region there may be one or more Islands' of one or more pores comprising seal component surrounded by pores comprising ion-conducting component. Alternatively, in the blended region there may be one or more 'islands' of one or more pores comprising ion-conducting component surrounded by pores comprising seal component.

Alternatively, the blended region may comprise a mixture of two or more of the arrangements described above.

The interface of the first region(s) and second region(s) may not be perfectly linear, but may be irregular, for example providing a 'wavy' line.

Alternatively, there may be a mixture of an irregular interface and a blended region.

Although described with reference to the transverse direction, the blended region and irregular interface could also apply to the through-plane direction (z-direction) particularly in the case where the strips are formed in a plurality of deposition steps as described hereinafter.

The ion-conducting component and/or sealing component do not extend beyond the planar reinforcing component in a thickness direction, such that only sufficient ion-conducting component and/or seal component is used as required to fill the pores of the planar reinforcing component.

Alternatively, the ion-conducting component and/or seal component extends beyond the planar reinforcing component in a thickness direction such that there is a layer of ion-conducting component and/or seal component which is not impregnated into the planar reinforcing component on one or both sides of the planar reinforcing component. This unreinforced layer of ion-conducting component and/or seal component may be applied in an additional step (as described hereinafter), or the unreinforced layer of ion-conducting component and/or seal component may be created by shrinkage of the planar reinforcing component on drying.

Any unreinforced layer of seal component may overlap the ion-conducting component (ion-conducting component either impregnated into the pores of the planar reinforcing component or ion-conducting component extending beyond the planar reinforcing component in a through-plane direction (z-direction). Any overlap may be greater than or equal to 1 mm. The overlap may be less than or equal to 10 mm. Alternatively, instead of being an overlap there may be a blended region as herein before described comprising both ion-conducting component and seal component.

The seal component may be co-extensive with the planar reinforcing component. Alternatively, the seal component may extend beyond the planar reinforcing component in the planar transverse direction.

If the reinforced MSA contains more than one strip of ion-conducting component, the process optionally further comprises isolating a portion of the reinforced MSA having a single strip of the ion-conducting component between two of said strips of seal component from the reinforced MSA having two or more strips of ion-conducting component. Isolation is preferably by slitting in a machine direction along one or more strips of seal component. This provides a single strip of reinforced MSA which can subsequently be cut into individual reinforced MSAs by including a cutting step in which the single strip is cut in a transverse direction either before or after removing the temporary carrier component.

The seal component and ion-conducting component are applied as a liquid or dispersion, in an appropriate solvent, by any suitable technique known to those in the art, in conjunction with appropriate masking where appropriate. Such techniques include gravure coating, slot die (slot, extrusion) coating (whereby the coating is squeezed out under pressure via a slot onto the temporary carrier component), screen printing, rotary screen printing, inkjet printing, spraying, painting, bar coating, pad coating, gap coating techniques such as knife or doctor blade over roll (whereby the coating is applied to the temporary carrier component then passes through a slit between the knife and a support roller), and metering rod application such as with a Meyer bar. The ion-conducting component and the seal component strips are suitably applied by slot die coating. The seal component may also be suitably applied by gravure coating.

The ion-conducting component and seal component are dried individually after deposition of each or may be dried in a single step once both are deposited. Drying is only carried out once the wet ion-conducting component and/or seal component has impregnated the planar reinforcing component. Drying, essentially to remove the solvent(s) from the ion-conducting or seal component coating dispersions, may be effected by any suitable heating technique known to those in the art, for examples air impingement, infra-red, etc. Suitably, the drying is typically carried out at a temperature of 70-120° C. but will depend on the nature of the solvent and could be up to or over 200° C.

The seal component and, depending on its nature, the ion-conducting component, may also be cured, in addition to being dried, to provide mechanical and/or chemical strength of the component. Curing is a chemical reaction to effect a change, such as crosslinking, and could be thermally activated (e.g. by heat or IR) or activated by ultraviolet energy.

The ion-conducting component may be annealed, in addition to being dried (and optionally cured) to alter and strengthen the crystalline structure of the ionomer. Any annealing step would employ elevated temperature compared to the drying step, for example, up to 200° C.

The curing and/or annealing steps may be carried out after each drying step or at the end of the deposition process before removal of the temporary carrier component. Depending on the materials used for the seal component and ion-conducting component, the curing and annealing may be effected in a single step.

The present invention further provides a reinforced membrane-seal assembly comprising:
  one or more strips of an ion-conducting component in a plane,
  a plurality of strips of seal component in the same plane,
  wherein the one or more strips of an ion-conducting component abuts two of said strips of seal component, and
  a planar reinforcing component comprising a plurality of pores,
wherein the ion-conducting component and the seal component fill the plurality of pores,
  wherein each strip of ion-conducting component extends from a first end of said assembly to a second opposite end.

Preferably the reinforced MSA is manufactured according to the method described herein.

Preferably the reinforced MSA comprises a single strip of the ion-conducting component.

The method disclosed herein may further comprise the steps required to add further components and layers to the reinforced MSA to form a CCM, or a MEA.

A catalyst-coated membrane (CCM) of the invention has utility in an electrochemical cell, such as a fuel cell, requiring a catalyst-coated membrane. In a CCM the reinforced MSA has first and second faces extending in the plane, and the process further comprises forming a layer comprising catalyst material (the catalyst layer) on one or both of the first and second faces on at least a portion of the ion-conducting component.

The method of forming a layer comprising catalyst material on one or both of the first and second faces may be by a conventional indirect decal transfer method, a direct coating method onto the reinforced MSA, or an additive layer process. In a conventional decal transfer method the reinforced MSA can be used as a component in a fabrication process where catalyst layers are added, such as by the use of a strip of preformed catalyst layer on a decal transfer sheet (i.e. hot pressed off a PTFE sheet) to one or both sides of the reinforced MSA to form the CCM.

If an additive layer process is used (for example as described in WO2015/145128), the catalyst layer may be deposited first and then the reinforced MSA of the invention is formed on top of this foundation catalyst layer. The second catalyst layer would then be deposited onto the upper exposed surface of the reinforced MSA.

Alternatively, the first and second catalyst layers may be deposited directly onto one or both faces of the reinforced MSA. The catalyst material, if being deposited, may be applied using the methods disclosed above for the seal component and the ion-conducting material. The catalyst material is suitably applied as an ink, either organic or aqueous (but preferably aqueous). The ink may suitably comprise other components, such as ion-conducting polymer as described in EP0731520, which are included to improve the ionic conductivity within the layer. The catalyst material is applied as discrete discontinuous patches or as continuous strips; by patches is meant discrete areas which are not connected to each other.

Preferably the catalyst layer is provided in strips which align with the strips of ion-conducting component. This permits the same manufacturing techniques to be applied, which benefit from the manufacturing efficiencies of working with a roll of the reinforced MSA.

The catalyst material comprises one or more electrocatalysts. The one or more electrocatalysts are independently a finely divided unsupported metal powder, or a supported catalyst wherein small nanoparticles of metal are dispersed on high surface area electrically conducting carbon supports. The metal is suitably selected from:
(i) the platinum group metals (platinum, palladium, rhodium, ruthenium, iridium and osmium),
(ii) gold or silver,
(iii) a base metal,
or an alloy or mixture comprising one or more of these metals or their oxides.

The preferred metal is platinum, which may be alloyed with other precious metals or base metals. If the electrocatalyst is a supported catalyst, the loading of metal nanoparticles on the carbon support material is suitably in the range 10-90 wt %, preferably 15-75 wt % of the weight of resulting electrocatalyst.

The exact catalyst material used will depend on the reaction it is intended to catalyse and its selection is within the capability of the skilled person.

The catalyst layer may further comprise additional components. Such additional components include, but are not limited to, a catalyst which facilitates oxygen evolution and therefore will be of benefit in cell reversal and start-up/shut down situations, or a hydrogen peroxide decomposition catalyst. Examples of such catalysts and any other additives suitable for inclusion in the catalyst layer will be known to those skilled in the art.

The thickness of the CCM in the through-plane direction (z-direction) in the region comprising catalyst material and ion-conducting component will depend on its final application. In general however, the thickness will be ≤300 μm, such as ≤150 μm, such as ≤80 μm for example ≤50 μm. Suitably, the thickness is ≥10 μm. In one embodiment, the final CCM has a thickness in the through-place direction (z-direction) in the region comprising catalyst material and ion-conducting component of from 15-50 μm.

Additional components, such as a barrier layer and/or an adhesive component may also be incorporated as described in more detail in WO2015/145128.

The invention further provides a membrane electrode assembly comprising a reinforced MSA of the invention and a catalyst layer and a gas diffusion layer present on at least one face of the reinforced MSA. A catalyst layer and a gas diffusion layer may be present on both faces of the reinforced MSA.

An MEA comprising a reinforced MSA of the invention may be made up in a number of ways including, but not limited to:
(i) a reinforced MSA of the invention may be sandwiched between two gas diffusion electrodes (one anode and one cathode);
(ii) a CCM of the invention in which the reinforced MSA is coated on one side only by a catalyst layer may be sandwiched between a gas diffusion layer and a gas diffusion electrode, the gas diffusion layer contacting the side of the CCM coated with the catalyst layer; or
(iii) a CCM of the invention in which the reinforced MSA is coated on both sides with a catalyst layer may be sandwiched between two gas diffusion layers.

The gas diffusion layers are suitably based on conventional gas diffusion substrates. Typical substrates include non-woven papers or webs comprising a network of carbon fibres (e.g. the H2315 series available from Freudenberg FCCT KG, Germany, or the Sigracet® series available from SGL Technologies GmbH, Germany or AvCarb® series from AvCarb Material Solutions, United States of America), a thermoset resin binder (e.g. the TGP-H series of carbon fibre paper available from Toray Industries Inc., Japan) or woven carbon cloths. The carbon paper, web or cloth may be provided with a further treatment prior to being incorporated into an MEA either to make it more wettable (hydrophilic) or more wet-proofed (hydrophobic). The nature of any treatments will depend on the type of fuel cell and the operating conditions that will be used.

The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE). The gas diffusion layers are attached by conventional techniques.

The reinforced MSA, CCM or MEA may further comprise an additive. The additive may be present internally within the reinforced MSA, CCM or MEA or in the case of the CCM or MEA, may be present at one or more of the interfaces between the various layers and/or within one or more of the layers.

The additive may be one or more selected from the group consisting of hydrogen peroxide decomposition catalysts, radical scavengers, free radical decomposition catalyst, self-regenerating antioxidant, hydrogen donors (H-donor) primary antioxidant, free radical scavenger secondary antioxidant, oxygen absorbers (oxygen scavenger). Examples of these different additives may be found in WO2009/040571 and WO2009/109780. A preferred additive is cerium dioxide (cerin).

BRIEF DESCRIPTION OF THE DRAWINGS

FIGS. 1 to 4 show non-limiting figures according to the present invention.

The invention will now be described in relation to the attached figures.

Figure 1:
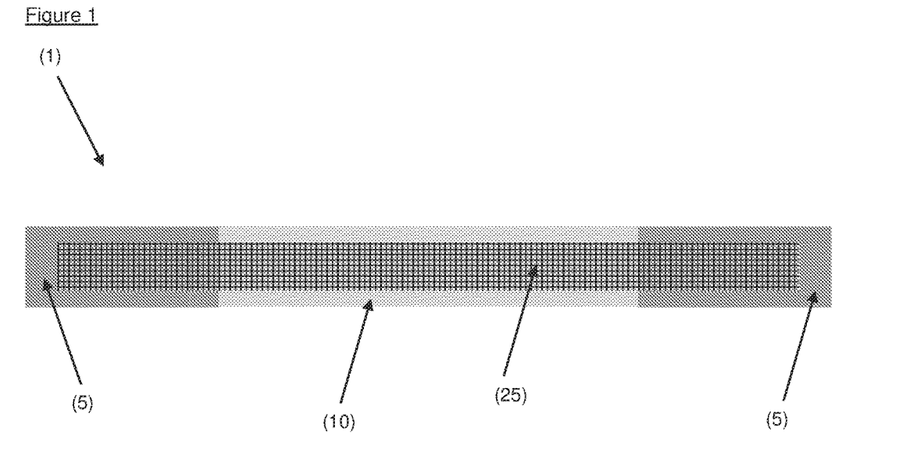
FIG. 1 shows a cross-section through a reinforced MSA.

The invention provides a reinforced MSA that at least comprises a continuous strip of ion-conducting component (which forms the membrane) that is contacted along the two long edges (as made) by a seal component. These are preferably applied simultaneously from liquid dispersions, where the two components share a single planar reinforcing component. This means that the planar reinforcing component spans the interface between the ion-conducting component and the seal component. This planar reinforcing component may or may not be continuous to the edge of the reinforced MSA, in the transverse direction, but must be continuous across the ion-conducting component and the two interfaces. The seal component and ion-conducting component can be different thicknesses, with the seal component being either thicker or thinner than the ion-conducting component, but would ideally be essentially the same thickness so as to avoid any step heights between the two components. FIG. 1 shows a cross-section (in the transverse direction) of such a reinforced MSA (1), for the embodiment in which there is one strip of the ion-conducting component. In particular, this shows how the planar reinforcing component (25) spans between the interface between strips of seal component (5) and ion-conducting component (10).

Figure 2:
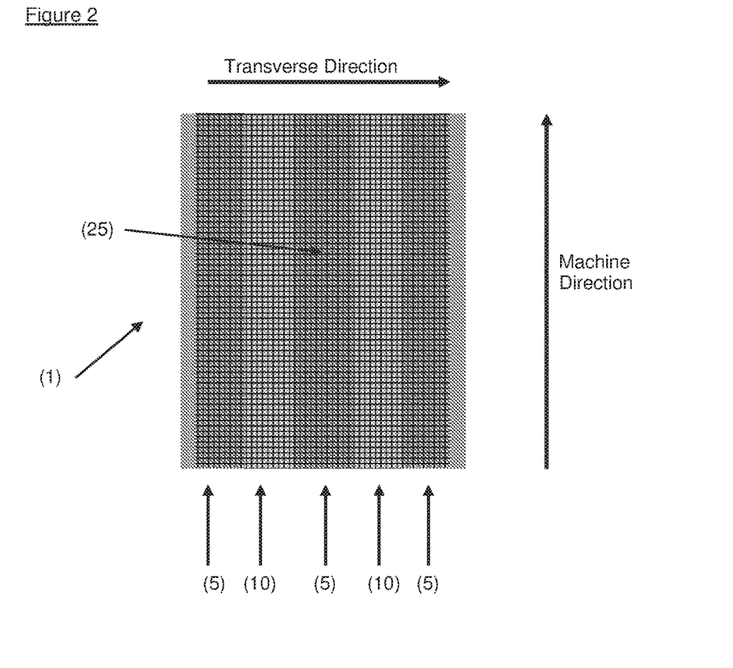
FIG. 2 shows plan view of a reinforced MSA.

FIG. 2 shows a plan view of a reinforced MSA (1), which illustrates the embodiment of there being a plurality of strips of the ion-conducting component. The plane of the MSA (1) is shown, such that there are strips of seal component (5) and ion-conducting component (10) visible. The planar reinforcing component (25) extends across all strips.

In particular, FIG. 2 shows a product design where the reinforced MSA has been manufactured with strips of seal component (5) on each side of each strip of ion-conducting component (10). These coating processes can be performed separately or simultaneously. The advantage of coating the two materials simultaneously is that a planar reinforcing component is introduced to the layers when they are both wet and therefore more readily spans the interface between the two components. The seal component and ion-conducting component are deposited so that the dry layers are the same height.

The product can be made by using a slot die system that coats two separate materials side by side simultaneously; this will be able to coat the ion-conducting component in the centre and two strips of seal component (one on each side of the ion-conducting component). The two materials can be deposited with a small gap between them that will close after deposition so that the two dispersions come into contact with each other. While the materials are still wet a planar reinforcing component such as ePTFE is laid on top of the wet components so that it becomes immersed into the wet components as it is impregnated. In this way the planar reinforcing component spans the interface between the different materials. A second layer of the two materials can then be deposited on top of the first layer, after drying, to help achieve the desired thickness and also ensure that the planar reinforcing component is fully impregnated. The interface in the second layers can either be in line with those in the first layer or off-set depending on the product design required. Subsequent layers can be deposited as required.

The second (or any subsequent) layer) of the ion-conducting and seal components may also comprise a second (or subsequent) planar reinforcing component. Where two or more planar reinforcing components are present, these may the same or different. If the planar reinforcing components are anisotropic, the direction of isotropy in adjacent planar reinforcing components may be the same or may be at an angle, such as at 90', to each other to provide additional stability in all directions.

On a continuous reel-to-reel manufacturing line it is also envisaged that multiple strips of MSAs could be deposited, as one complete roll good material, across the width of the manufacturing line. In this case, x strips of ionomer would be deposited and be bordered by x+1 strips of seal component. The planar reinforcing component could be applied as multiple individual strips to each distinct MSA or as a single planar reinforcing component across the whole width of the multiple MSA.

Figure 3A:
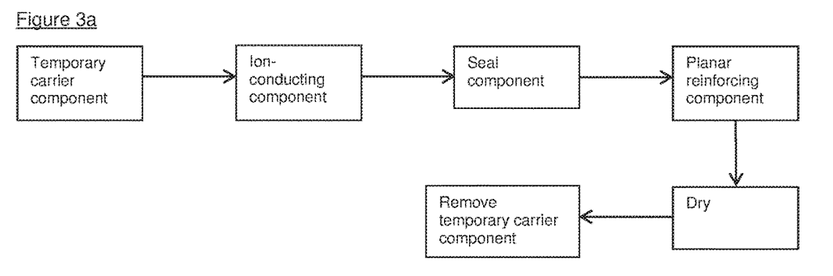
FIGS. 3-4 are flow diagrams showing processes to prepare the reinforced MSA of the invention.
Figure 3B:
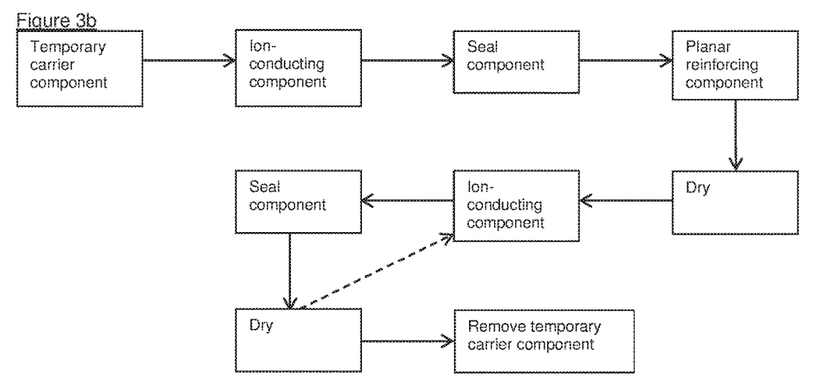

FIGS. 3a and 3b show flow diagrams depicting a process of the invention. In FIG. 3a, a temporary carrier component is provided onto which the components comprising the reinforced MSA are applied. The ion-conducting component and seal component are deposited simultaneously onto the temporary carrier component as one or more strips. By the term "simultaneous" it is meant that the components are coated in the same single pass of the temporary carrier component through the process, such that they are both still wet prior to application of the planar reinforcing component. However, one coating head can be positioned ahead of the other, such that one component is laid down first, followed by the second component, in the same pass. In FIG. 3a the ion-conducting component is deposited onto the temporary carrier component ahead of the seal component. The components are deposited on the temporary carrier component in strips parallel to each other. The planar reinforcing component is laid onto the wet ion-conducting component and seal component on the temporary carrier component. The ion-conducting component and seal component once impregnated into the pores of the planar reinforcing component are dried. The process shown in FIG. 3a concludes with removal of the temporary carrier component. This could be carried out immediately or at some point downstream in the assembly of a MEA.

In FIG. 3b, additional ion-conducting component and seal component is applied to the planar reinforcing component in the regions previously impregnated with that component and dried. Applying additional ion-conducting component and seal component may be carried out as many times as required (indicated by dotted line) to ensure complete impregnation and/or provision of an unreinforced layer of ion-conducting component and/or seal component extending beyond the planar reinforcing component in the z-direction. Although additional deposition of both ion-conducting component and seal component is shown, it will be appreciated that in any additional pass, only one of these components may be deposited. The process shown in FIG. 3b concludes with removal of the temporary carrier component. As indicated above, this could be carried out immediately or at some point downstream in the assembly of a MEA.

Figure 3C:
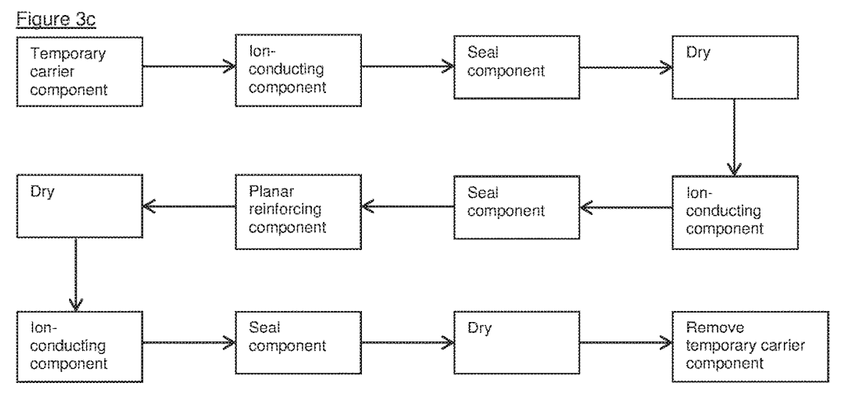

In FIG. 3c, a layer of ion-conducting component and seal component is first applied to the carrier layer in the requisite strips. The ion-conducting component and seal component is dried to form a layer that does not contain a planar reinforcing component. Further ion-conducting component and seal component is applied to this layer in the regions that will subsequently correspond to the strips and the planar reinforcing component is laid onto the wet ion-conducting component and seal component. The ion-conducting component and seal component impregnate into the pores of the planar reinforcing component and are dried. Further ion-conducting component and seal component is applied to the planar reinforcing component in the regions previously impregnated with that component and dried forming a layer of ion-conducting and seal component that does not contain a planar reinforcing component. The process shown in FIG. 3c concludes with removal of the temporary carrier component. As indicated above, this could be carried out immediately or at some point downstream in the assembly of a MEA.

Figure 4A:
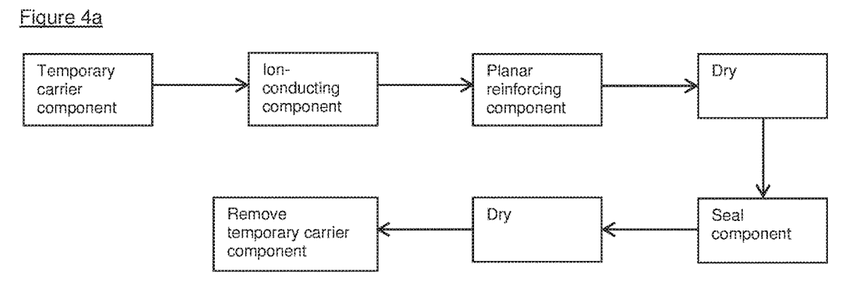
Figure 4B:
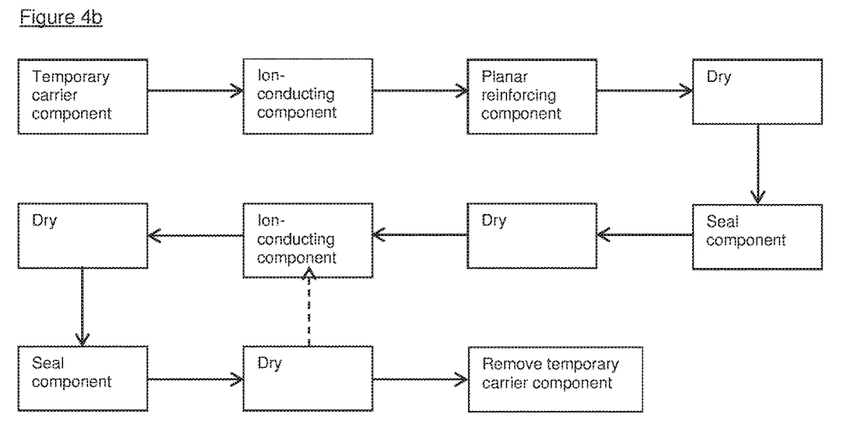

FIGS. 4a and 4b show flow diagrams depicting an alternative sequential deposition process of the invention. In FIG. 4a, a temporary carrier component is provided onto which the components comprising the reinforced MSA are applied. Firstly, an ion-conducting component is applied onto the temporary carrier component in one or more strips. The planar reinforcing component is laid onto the temporary carrier component and the ion-conducting component impregnates into the pores of the planar reinforcing component. Once the ion-conducting component is impregnated into the planar reinforcing component, it is dried. The seal component is then applied to the planar reinforcing component in strips to abut the ion-conducting component. The seal component impregnates into the planar reinforcing component and once impregnated is dried. The process shown in FIG. 4a then concludes with removal of the temporary carrier component. As indicated above, this could be carried out immediately or at some point downstream in the assembly of a MEA.

In FIG. 4b, additional ion-conducting component is applied to the planar reinforcing component in the regions previously impregnated with ion-conducting component and dried. Additional seal component is applied to the planar reinforcing component in the regions previously impregnated with seal component and dried. Applying additional ion-conducting component and seal component can be carried out as many times as required (indicated by dotted line) to ensure complete impregnation and/or the provision of a layer of seal component and/or ion-conducting component extending beyond the planar reinforcing component. The process shown in FIG. 4b then concludes with removal of the temporary carrier component. As indicated above, this could be carried out immediately or at some point downstream in the assembly of a MEA.

It will be appreciated by the skilled person that although FIGS. 4a and 4b show the ion-conducting component being applied first followed by the seal component, the process would work equally well if the seal component were applied first followed by the ion-conducting component.

FIGS. 3b and 4b show additional deposition of both ion-conducting component and seal component; however, it will be understood and appreciated by those skilled in the art that it is possible for an additional layer of only one of ion-conducting component or seal component to be deposited. It will also be understood and appreciated by those skilled in the art that the ion-conducting component and seal component used in the additional deposition may be the same or different to the ion-conducting component and seal component used in previous depositions. For example, perfluorosulphonic acid ionomers of varying equivalent weights may be used as the ion-conducting components.

All of the embodiments described hereinabove for the CCM products apply equally to use in proton exchange membrane (PEM) based electrolysers. In these PEM electrolysers, a voltage is applied across the CCM such that water supplied to the device is split into hydrogen and oxygen, at the cathode and anode respectively. The CCMs may require different catalyst components to a PEM fuel cell, such as Ir and Ru based materials at the anode, but are otherwise very similar in construction to CCMs for fuel cells The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A process for the manufacture of a reinforced membrane-seal assembly, the process comprising:
   forming one or more strips of an ion-conducting component in a plane on a temporary carrier component,
   forming a plurality of strips of seal component in the same plane on the temporary carrier component, such that the one or more strips of an ion-conducting component lie between two of said strips of seal component,
   wherein a planar reinforcing component comprising a plurality of pores is provided in the plane, such that the ion-conducting component and the seal component fill the plurality of pores,
   wherein the one or more strips of an ion-conducting component, the plurality of strips of seal component and the planar reinforcing component thereby together form a reinforced membrane-seal assembly, and wherein each strip of ion-conducting component extends from a first end of said assembly to a second opposite end.

2. The process according to claim 1, wherein one strip of ion-conducting component lies between two strips of seal component.

3. The process according to claim 1, wherein a plurality of strips of ion-conducting component are formed, each strip of ion-conducing component lying between two strips of seal component, and wherein the strips of ion-conducting component and the strips of seal component alternate.

4. The process according to claim 3, comprising a further step of slitting the strips of seal component along their length to provide a single strip of ion-conducting component between two strips of seal component.

5. The process according to claim 1, wherein the one or more strips of an ion-conducting component and the plurality of strips of seal component are formed by deposition and wherein the planar reinforcing component is provided after the one or more strips of an ion-conducting component and the plurality of strips of seal component are deposited.

6. The process according to claim 1, wherein the one or more strips of an ion-conducting component and the plurality of strips of seal component are formed by deposition on the planar reinforcing component.

7. The process according to claim 1, wherein the one or more strips of an ion-conducting component and the plurality of strips of seal component are simultaneously deposited.

8. The process according to claim 1, wherein the one or more strips of ion-conducting component and/or the plurality of strips of seal component are deposited by slot die coating.

9. The process according to claim 1, wherein the one or more strips of an ion-conducting component and/or the plurality of strips of seal component are formed from a plurality of sequentially deposited layers.

10. The process according to claim 1, the method further comprising a step of removing the membrane-seal assembly from the temporary carrier component.

11. The process according to claim 1, wherein the planar reinforcing component extends to the edge of the reinforced membrane seal assembly in a transverse direction.

12. The process according to claim 1, wherein the planar reinforcing component does not extend to the edge of the reinforced membrane seal assembly in the transverse direction.

13. A reinforced membrane-seal assembly comprising:
one or more strips of an ion-conducting component in a plane,
a plurality of strips of seal component in the same plane,
wherein the one or more strips of an ion-conducting component abuts two of said strips of seal component, and
a planar reinforcing component comprising a plurality of pores,
wherein the ion-conducting component and the seal component fill the plurality of pores,
wherein each strip of ion-conducting component extends from a first end of said assembly to a second opposite end.

14. The reinforced membrane-seal assembly of claim 13, comprising a single strip of the ion-conducting component.

15. A reinforced membrane-seal assembly obtainable by the method of claim 1.

* * * * *